United States Patent
Chernega

(10) Patent No.: US 7,984,023 B2
(45) Date of Patent: Jul. 19, 2011

(54) METHOD AND UTILITY FOR COPYING FILES FROM A FAULTY DISK

(75) Inventor: Gary J. Chernega, Beacon, NY (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 11/867,159

(22) Filed: Oct. 4, 2007

(65) Prior Publication Data

US 2009/0094293 A1  Apr. 9, 2009

(51) Int. Cl.
  G06F 7/00   (2006.01)
  G06F 17/00  (2006.01)
(52) U.S. Cl. .......................... 707/687; 714/15
(58) Field of Classification Search ............... 707/640, 707/667, 672, 687; 714/15
  See application file for complete search history.

(56) References Cited

U.S. PATENT DOCUMENTS

| | | | |
|---|---|---|---|
| 5,951,695 A | 9/1999 | Kolovson | |
| 6,151,685 A | 11/2000 | Li et al. | |
| 6,173,291 B1* | 1/2001 | Jenevein | 707/200 |
| 6,263,454 B1* | 7/2001 | Gold et al. | 714/25 |
| 6,539,496 B1 | 3/2003 | Peters et al. | |
| 6,594,780 B1 | 7/2003 | Shen et al. | |
| 6,745,340 B1* | 6/2004 | Liu et al. | 714/5 |
| 6,918,056 B2* | 7/2005 | Paek | 714/27 |
| 7,024,581 B1 | 4/2006 | Wang et al. | |
| 7,330,947 B2* | 2/2008 | Hasegawa | 711/162 |
| 7,437,609 B2* | 10/2008 | Anderson et al. | 714/20 |
| 2002/0065999 A1* | 5/2002 | Kikuchi et al. | 711/162 |
| 2002/0069376 A1* | 6/2002 | Gregg et al. | 714/6 |
| 2002/0169996 A1* | 11/2002 | King et al. | 714/8 |
| 2003/0037279 A1 | 2/2003 | Laio | |
| 2003/0177324 A1* | 9/2003 | Timpanaro-Perrotta | 711/162 |
| 2004/0128582 A1 | 7/2004 | Chou | |
| 2004/0268070 A1* | 12/2004 | Hasegawa | 711/162 |
| 2005/0010616 A1* | 1/2005 | Burks | 707/204 |
| 2005/0165863 A1* | 7/2005 | Mukker | 707/202 |
| 2005/0193035 A1* | 9/2005 | Byrne | 707/202 |
| 2005/0228836 A1* | 10/2005 | Bacastow et al. | 707/204 |
| 2007/0055687 A1* | 3/2007 | Josten et al. | 707/102 |
| 2007/0180289 A1* | 8/2007 | Chai et al. | 714/4 |
| 2007/0220308 A1* | 9/2007 | Yeung et al. | 714/5 |
| 2008/0016130 A1* | 1/2008 | Cannon et al. | 707/204 |
| 2009/0089628 A1* | 4/2009 | Day et al. | 714/54 |
| 2009/0094293 A1* | 4/2009 | Chernega | 707/202 |

* cited by examiner

*Primary Examiner* — Kuen S Lu
*Assistant Examiner* — Susan F Rayyan
(74) *Attorney, Agent, or Firm* — William Schiesser; Hoffman Warnick LLC

(57) ABSTRACT

The present invention provides a faulty disk copy utility. A method for copying files in accordance with an embodiment of the present invention includes: obtaining a list of files to be copied from a first location to a second location; initiating copying of a file from the list; logging an identifier of the file in a log file if an error occurs during the copying; and repeating the copying and logging for each file in the list of files; wherein the copying of the files from the list does not end if an error occurs during the copying.

16 Claims, 4 Drawing Sheets

METHOD AND UTILITY FOR COPYING FILES FROM A FAULTY DISK

FIELD OF THE INVENTION

The present invention relates to the copying of files, and more specifically relates to a method and utility for copying files from a faulty disk.

BACKGROUND OF THE INVENTION

When copying files from one source (e.g., a first hard drive) to another source (e.g., a second hard drive) using Windows, the occurrence of a read.write error causes the copying process to stop (Windows, is a trademark of Microsoft Corporation in the United States, other countries, or both). When such a read.write error occurs, the copying process becomes very time consuming, requiring extensive manual processing. An example of this problem is depicted in FIG. 1.

An illustrative flow diagram of a copying process in accordance with the related art is depicted in FIG. 1. In S1, an attempt is made to copy a file (e.g., from a damaged hard drive to a replacement hard drive). If an error does not occur (No, S2), the file is copied in S3. If additional files need to be copied (No, S4), flow passes back to S1. Otherwise, the copying process ends.

If an error occurs during copying (Yes, S2), flow passes to S5, where the copying process ends without copying any remaining files. A user must then determine in S6 where the system stopped copying files and select in S7 any remaining files not already copied. Flow then passes back to S1. S5-S7 are repeated each time an error occurs during copying.

Accordingly, there is a need for a file copying methodology that addresses the deficiencies of the related art.

SUMMARY OF THE INVENTION

The present invention relates to a method and utility for copying files from a faulty disk. The faulty disk copy utility generates a list of the files to be copied by parsing the directory tree of a damaged hard drive (e.g., using the Windows file system). The faulty disk copy utility maximizes data recovery from the damaged hard drive by copying all recoverable files from the damaged hard drive to a replacement hard drive and logging all non-recoverable files (e.g., in response to a read.write error) in a log file. When an error occurs while copying a file, the faulty disk copy utility logs the error in the log file and continues with the next file. A file recovery utility can be run against the non-recoverable files listed in the log file to maximize recovery of data from the damaged hard drive.

A first aspect of the present invention is directed to a method for copying files, comprising: obtaining a list of files to be copied from a first location to a second location; initiating copying of a file from the list; logging an identifier of the file in a log file if an error occurs during the copying; and repeating the copying and logging for each file in the list of files; wherein the copying of the files from the list does not end if an error occurs during the copying.

A second aspect of the present invention is directed to a system for copying files, comprising: a system for obtaining a list of files to be copied from a first location to a second location; a system for initiating copying of a file from the list; and a system for logging an identifier of the file in a log file if an error occurs during the copying; wherein the copying and logging are repeated for each file in the list of files, and wherein the copying of the files from the list does not end if an error occurs during the copying.

A third aspect of the present invention is directed to a program product stored on a computer readable medium, which when executed, copies files, the computer readable medium comprising program code for: obtaining a list of files to be copied from a first location to a second location; initiating copying of a file from the list; logging an identifier of the file in a log file if an error occurs during the copying; and repeating the copying and logging for each file in the list of files; wherein the copying of the files from the list does not end if an error occurs during the copying.

A fourth aspect of the present invention is directed to a method for deploying an application for copying files, comprising: providing a computer infrastructure being operable to: obtain a list of files to be copied from a first location to a second location; initiate a copying of a file from the list; log an identifier of the file in a log file if an error occurs during the copying; and repeat the copying and logging for each file in the list of files; wherein the copying of the files from the list does not end if an error occurs during the copying.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
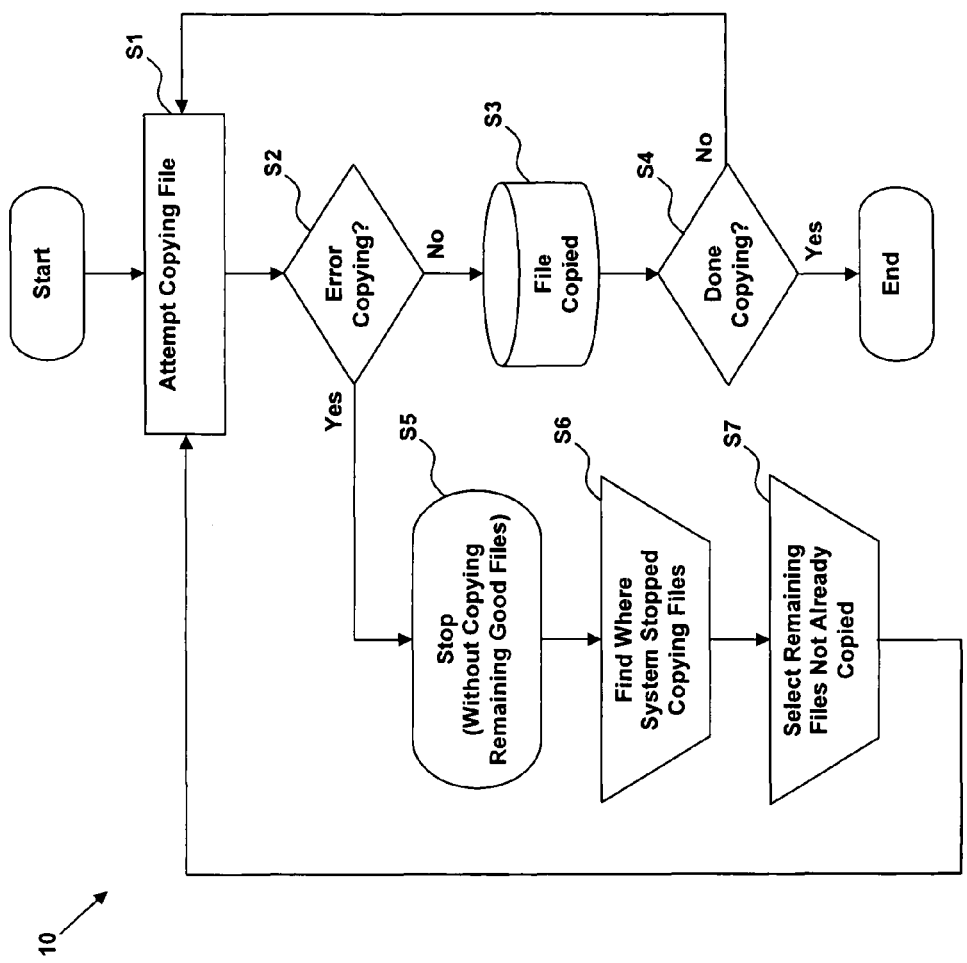
FIG. 1 depicts an illustrative flow diagram of a copying process in accordance with the related art.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention relates to a faulty disk copy utility. The faulty disk copy utility generates a list of the files to be copied by parsing the directory tree of a damaged hard drive (e.g., using the Windows file system). The faulty disk copy utility maximizes data recovery from the damaged hard drive by copying all recoverable files from the damaged hard drive to a replacement hard drive and logging all non-recoverable files (e.g., in response to a read.write error) in a log file. When an error occurs while copying a file, the faulty disk copy utility logs the error in the log file and continues with the next file. A file recovery utility can be run against the non-recoverable files listed in the log file to maximize recovery of data from the damaged hard drive.

Figure 2:
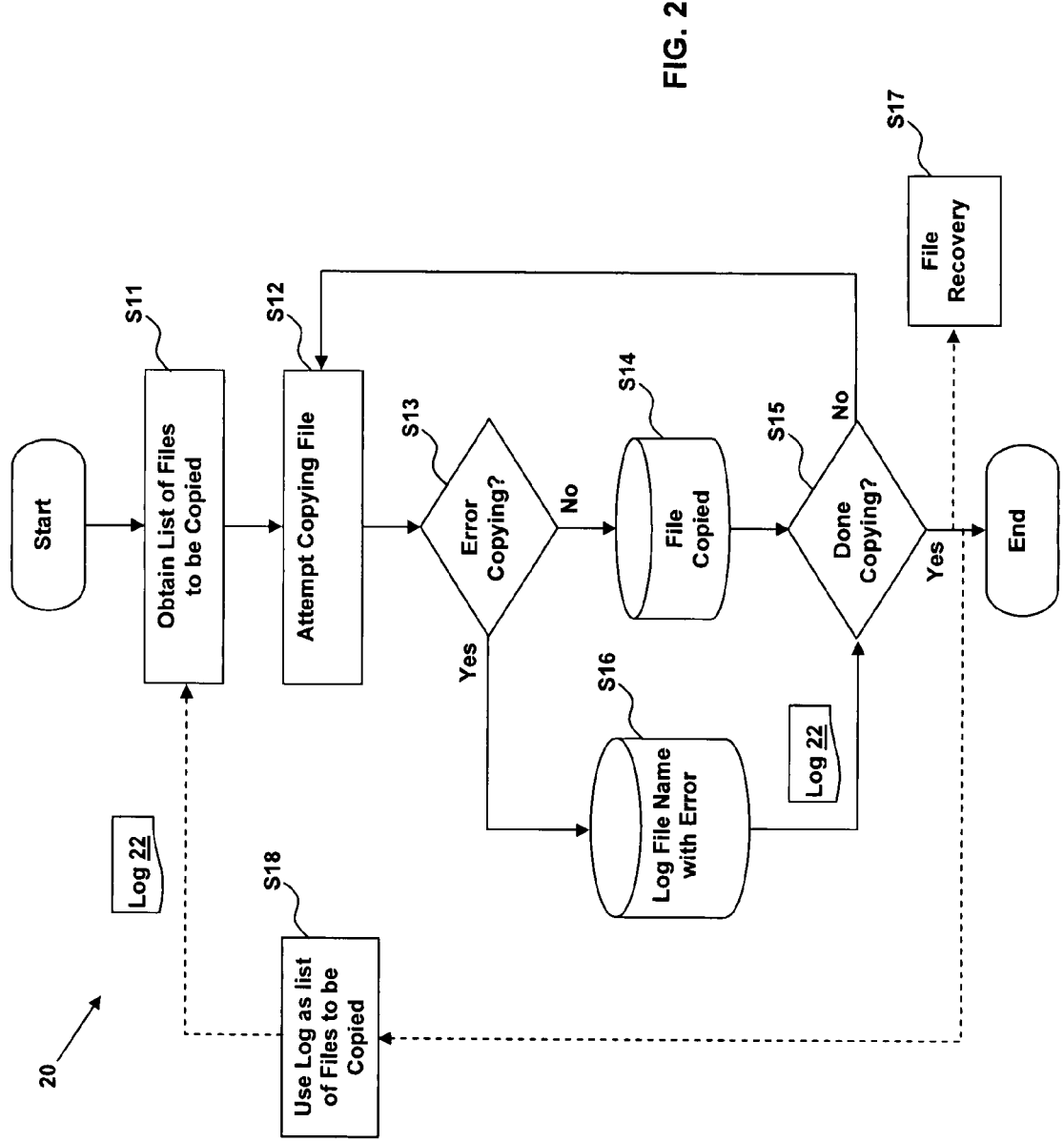
FIG. 2 depicts an illustrative flow diagram of a copying process provided by a faulty disk copy utility in accordance with an embodiment of the present invention.

An illustrative flow diagram of a copying process 20 provided by a faulty disk copy utility in accordance with an embodiment of the present invention is depicted in FIG. 2. In S11, a list of files to be copied from a damaged hard drive to a replacement hard drive is obtained by the faulty disk copy utility. Typically, the damaged and replacement hard drives are placed in the same machine to allow for drive to drive copy. However, this need not be the case. The faulty disk copy utility can obtain the list of files to be copied by parsing the directory tree of a damaged hard drive (e.g., using the Windows file system on a Windows-based system). Other techniques for obtaining the list of files to be copied may also be possible, and can differ depending on the operating system being used and other factors.

In S12, an attempt is made to copy a file in the list of files obtained in S11. If a read.write error or other type of error does not occur (No, S13), the file is copied to a replacement hard drive in S14. If additional files need to be copied (No, S15), flow passes back to S12. Otherwise, the copying process ends.

If an error occurs during the copying of the file (Yes, S13), flow passes to S16, where the name of the file (or other suitable identifier of the file) is logged in a log file 22. If the type of error that occurred can be determined, this information can also be logged. Flow then passes to S15. If additional files need to be copied (No, S15), flow passes back to S12. Otherwise, the copying process ends. In this way, the copying process continues, even when copying errors occur, thereby minimizing manual intervention.

The log file 22 generated in S16 provides a listing of all files not successfully copied. One or more file recovery utilities can then be run against the files listed in the log file 22 in S17. Alternatively, or in addition, at the completion of the copying process, the listing of non-recoverable files provided in the log file 22 can be fed back in S18 and used as input to the copying process in S11. In this way, the faulty disk copy utility can retry copying only the files that were unable to be copied earlier (i.e., the files listed in the log file 22). This allows a hard drive that is in a marginal state to be worked on multiple times without having to rerun the entire directory tree.

As detailed above, one or more file recovery utilities (e.g., Norton), especially those file recovery utilities that accept filenames as input to direct recovery efforts directly on the affected files, can be run against the files listed in the log file 22. A file recovery utility can be run asynchronously (as depicted in FIG. 2) and.or synchronously relative to the copying process. In some cases, it may be more beneficial to run the file recovery utility(ies) asynchronously to reduce wear.tear on the failing hard drive.

Figure 3:
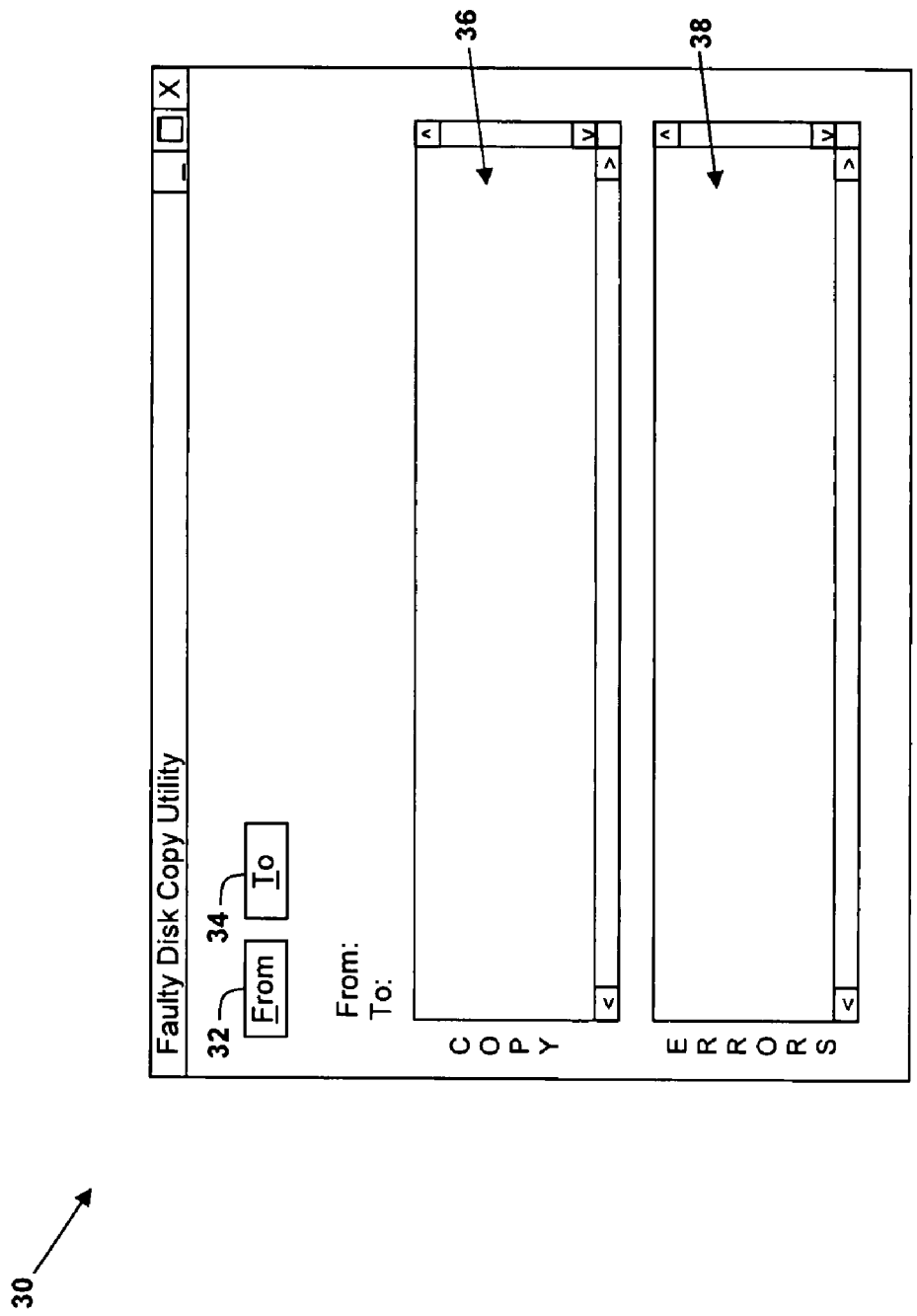
FIG. 3 depicts an illustrative user interface in accordance with an embodiment of the present invention.

An illustrative user interface (UI) 30 for a faulty disk copy utility in accordance with an embodiment of the present invention is depicted in FIG. 3. As shown, the UI 30 includes a "From" button 32 for choosing a source of files to be copied (e.g., a damaged hard drive), a "To" button 34 for choosing a destination of the copied files (e.g., a replacement hard drive), a "Copy" window 36 for displaying a list of the files to be copied, and an "Errors" window 38 for displaying a listing of non-recoverable files (e.g., the log file 22).

Figure 4:
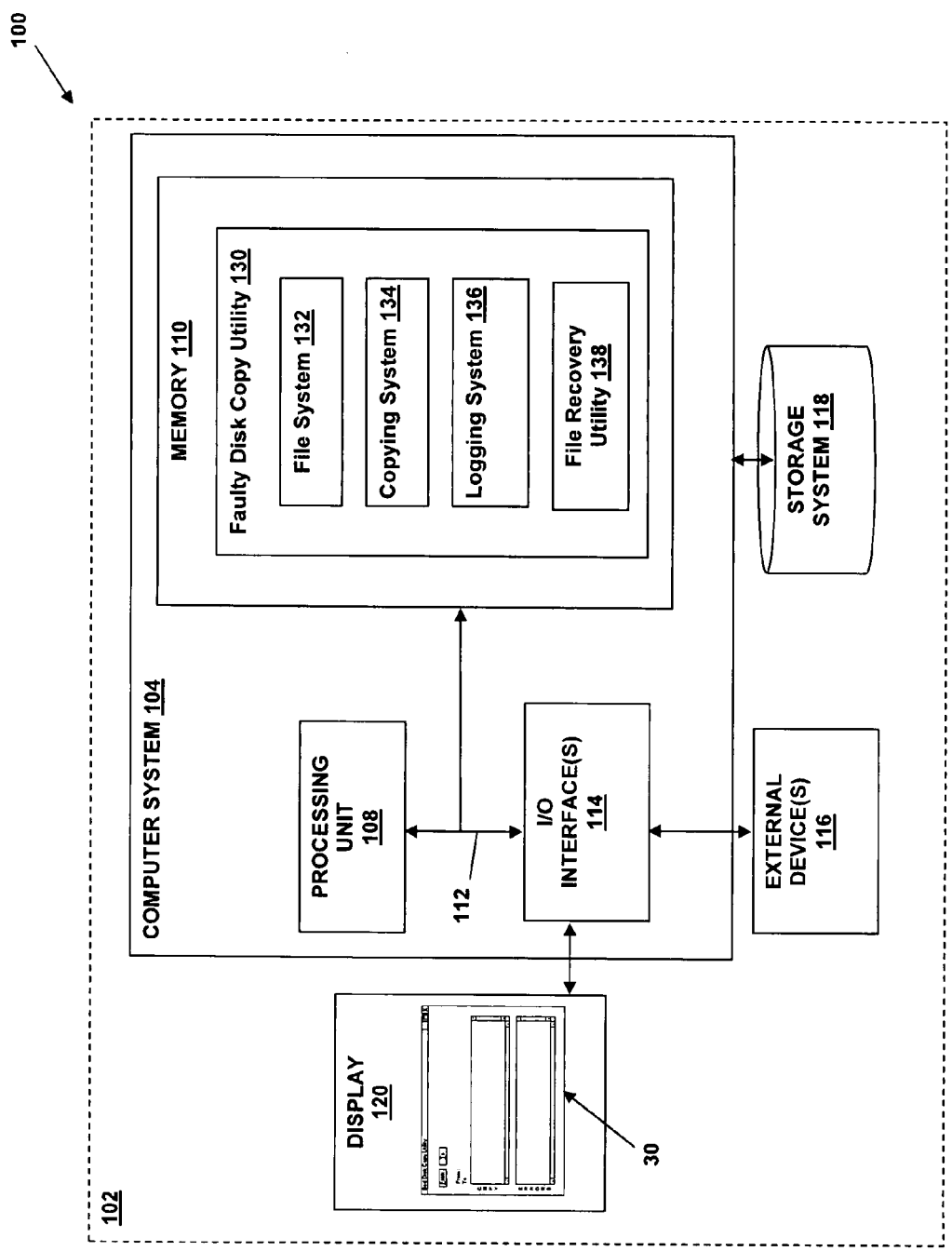
FIG. 4 depicts an illustrative computer system for implementing embodiment(s) of the present invention.

FIG. 4 depicts an illustrative system 100 for carrying out and.or implementing a faulty disk copy utility 130 in accordance with embodiment(s) of the present invention. The system 100 includes a computer infrastructure 102 that can perform the various processes described herein. The computer infrastructure 102 is shown including a computer system 104.

The computer system 104 is shown as including a processing unit 108, a memory 110, at least one input.output (I.O) interface 114, and a bus 112. Further, the computer system 104 is shown in communication with at least one external device 116 and a storage system 118. In general, the processing unit 108 executes computer program code, such as the faulty disk copy utility 130, that is stored in memory 110 and.or storage system 118. While executing computer program code, the processing unit 108 can read and.or write data from.to the memory 110, storage system 118, and.or I.O interface(s) 114. Bus 112 provides a communication link between each of the components in the computer system 104. The external device(s) 116 can comprise any device (e.g., display 120) that enables a user to interact with the computer system 104 or any device that enables the computer system 104 to communicate with one or more other computer systems.

The faulty disk copy utility 130 includes a file system 132 for obtaining a list of the files to be copied, a copying system 134 for copying files from a first location (e.g., a damaged hard drive) to a second location (e.g., a replacement hard drive), and a logging system 136 for generating a log file containing a listing of all files not successfully copied. The operations carried out by each of these systems is described in greater detail above. At least one file recovery utility 138 can be provided to recover data from the non-recoverable files.

The computer system 104 can comprise any general purpose computing article of manufacture capable of executing computer program code installed by a user (e.g., a personal computer, server, handheld device, etc.). However, it is understood that the computer system 104 is only representative of various possible computer systems that may perform the various processes of the invention. To this extent, in other embodiments, the computer system 104 can comprise any specific purpose computing article of manufacture comprising hardware and.or computer program code for performing specific functions, any computing article of manufacture that comprises a combination of specific purpose and general purpose hardware.software, or the like. In each case, the program code and hardware can be created using standard programming and engineering techniques, respectively.

Similarly, the computer infrastructure 102 is only illustrative of various types of computer infrastructures that can be used to implement the present invention. For example, in one embodiment, the computer infrastructure 102 comprises two or more computer systems (e.g., a server cluster) that communicate over any type of wired and.or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 4 can be implemented independently, combined, and.or stored in memory for one or more separate computer systems that communicate over a network. Further, it is understood that some of the systems and.or functionality may not be implemented, or additional systems and.or functionality may be included as part of the system 100.

It is understood that the invention further provides various alternative embodiments. For example, in one embodiment, the invention provides a computer-readable medium that includes computer program code to enable a computer infrastructure to carry out and.or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and.or storage system 118 (e.g., a fixed disk, a read-only memory, a random access memory, a cache memory, etc.), and.or as a data signal traveling over a network (e.g., during a wired.wireless electronic distribution of the program code).

In another embodiment, the invention provides a business method that performs the processes of the invention on a subscription, advertising, and.or fee basis. A service provider can create, maintain, support, etc., a computer infrastructure, such as the computer infrastructure 102, that performs the processes of the invention for one or more customers. In return, the service provider can receive payment from the customer(s) under a subscription and.or fee agreement and.or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the processes of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and.or modifying one or more existing systems of the computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application.software program, component software.a library of functions, an operating system, a basic I.O system.driver for a particular computing and.or I.O device, and the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for copying files, comprising:
using at least one computing device for:
obtaining a list of files to be copied from a first location to a second location by parsing a directory tree of the first location;
initiating copying of a file from the list;
logging an identifier of the file in an error log file if an error occurs during the copying;
repeating the copying and logging for each file in the list of files, wherein the copying of the files from the list does not end if an error occurs during the copying; and
performing a subsequent copying process using only the files listed in the error log file, the subsequent copying wherein the subsequent error log file provides a listing of all non-recoverable files in the list of files, process comprising initiating copying of a file listed in the error log file, logging an identifier of the file in a subsequent error log file if an error occurs in the subsequent copying, and repeating the subsequent copying and logging for each file listed in the error log file, wherein the copying of the files listed in the error log file does not end if an error occurs during the copying.

2. The method of claim 1, wherein the first location comprises a damaged hard drive, and wherein the second location comprises a replacement hard drive.

3. The method of claim 1, wherein the error comprises a read/write error.

4. The method of claim 1, further comprising:
running a file recovery utility against the files listed in the subsequent error log file.

5. The method of claim 4, wherein the file recovery utility accepts the identifier of each file in the subsequent error log file as input.

6. A faulty disk copy utility for copying files, comprising:
at least one computing device, including:
a system for obtaining a list of files to be copied from a first location to a second location by parsing a directory tree of the first location;
a system for initiating copying of a file from the list;
a system for logging an identifier of the file in a log file if an error occurs during the copying, wherein the copying and logging are repeated for each file in the list of files, and wherein the copying of the files from the list does not end if an error occurs during the copying; and
a system for performing a subsequent copying process using only the files listed in the error log file, the subsequent copying process comprising initiating copying of a file listed in the error log file, logging an identifier of the file in a subsequent error log file if an error occurs in the subsequent copying, and repeating the subsequent copying wherein the subsequent error log file provides a listing of all non-recoverable files in the list of files, and logging for each file listed in the error log file, wherein the copying of the files listed in the error log file does not end if an error occurs during the copying.

7. The faulty disk copy utility of claim 6, wherein the first location comprises a damaged hard drive, and wherein the second location comprises a replacement hard drive.

8. The faulty disk copy utility of claim 6, wherein the error comprises a read/write error.

9. The faulty disk copy utility of claim 6, further comprising:
a system for running a file recovery utility against the files listed in the subsequent error log file.

10. The faulty disk copy utility of claim 6, wherein the file recovery utility accepts the identifier of each file in the subsequent error log file as input.

11. A program product stored on a computer readable storage medium, which when executed, copies files, the computer readable storage medium comprising program code for:
obtaining a list of files to be copied from a first location to a second location by parsing a directory tree of the first location;
initiating copying of a file from the list;
logging an identifier of the file in a log file if an error occurs during the copying;
repeating the copying and logging for each file in the list of files, wherein the copying of the files from the list does not end if an error occurs during the copying; and
performing a subsequent copying process using only the files listed in the error log file, the subsequent copying process comprising initiating copying of a file listed in the error log file, logging an identifier of the file in a subsequent error log file if an error occurs in the subsequent copying wherein the subsequent error log file provides a listing of all non-recoverable files in the list of files, and repeating the subsequent copying and logging for each file listed in the error log file, wherein the copying of the files listed in the error log file does not end if an error occurs during the copying.

12. The program product of claim 11, wherein the first location comprises a damaged hard drive, and wherein the second location comprises a replacement hard drive.

13. The program product of claim 12, wherein the error comprises a read/write error.

14. The program product of claim 12, further comprising: running a file recovery utility against the files listed in the subsequent error log file.

15. The program product of claim 14, wherein the file recovery utility accepts the identifier of each file in the subsequent error log file as input.

16. A method for deploying an application for copying files, comprising:
    providing a computer infrastructure being operable to:
        obtain a list of files to be copied from a first location to a second location by parsing a directory tree of the first location;
        initiate copying of a file from the list;
        log an identifier of the file in a log file if an error occurs during the copying; and
        repeat the copying and logging for each file in the list of files,
    wherein the copying of the files from the list does not end if an error occurs during the copying; and
    perform a subsequent copying process using only the files listed in the error log file, the subsequent copying process comprising initiating copying of a file listed in the error log file, logging an identifier of the file in a subsequent error log file if an error occurs in the subsequent copying, and repeating the subsequent copying and logging for each file listed in the error log file, wherein the copying wherein the subsequent error log file provides a listing of all non-recoverable files in the list of files, of the files listed in the error log file does not end if an error occurs during the copying.

* * * * *